United States Patent Office 3,284,383
Patented Nov. 8, 1966

3,284,383
EPOXIDE COMPOSITIONS
William R. Proops, Charleston, W. Va., assignor to Union
Carbide Corporation, a corporation of New York
No Drawing. Filed Dec. 29, 1961, Ser. No. 163,050
7 Claims. (Cl. 260—18)

This invention relates to epoxide compositions and to the curing of epoxides with certain tin catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantage of effecting rapid and uncontrolled exotherms during the cure of epoxides to resins, frequently causing thermal decomposition in the composition as evidenced by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives and potting compositions.

The present invention is based on the discovery that the products obtained by the oxidation of stannous acylates are especially effective catalysts for promoting the cure of epoxide compositions. It has been found that the incorporation of oxidized stannous acylates in epoxide compounds provides curable compositions which have a good working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components. In one aspect, mixtures of oxidized stannous acylates with epoxides containing the cyclohexene oxide or cyclopentene oxide group offer a distinct advantage over epoxides of the polyglycidyl ether type inasmuch as they can be reacted with various hardeners and foamed by internal development of carbon dioxide or by a blowing agent which vaporizes at or below the temperature of the forming mass to provide foamed polymers of widely varying and preselected properties. Foamed polymers of this type find wide utility in the field of structural reinforcement and insulation.

The catalysts which are employed in the instant invention are the products obtained by the oxidation of stannous acylates of the formula:

wherein R is a monovalent hydrocarbon radical, branched chain or straight chain, and containing from 1 to 54 carbon atoms and more preferably from 1 to 24.

In general, the oxidation is conveniently carried out by the addition of anhydrous oxygen to the liquid stannous acylate at a temperature of from about 25° C. to about 125° C. It is necessary that dry oxygen be employed to react with the stannous acylate, inasmuch as hydrolysis of the stannous acylate will occur in the presence of moisture. If desired, air may be used to perform the oxidation step, however, as indicated above, it should be dried before reaction with the stannous acylate. Other organic and inorganic oxidizing agents may also be used such as, benzoyl peroxide, diacetyl peroxide, potassium permanganate, and the like.

Analysis of the product obtained by the oxidation of the stannous acylates indicated that the absorption of oxygen corresponded to one-half mole of oxygen per mole of stannous acylate. The empirical formula was confirmed by elemental analysis. However, an ebullioscopic determination of the molecular weight demonstrated that the oxidized product had a weight twice that of the expected:

The product of oxidation was therefore either dimeric or corresponded to the structure:

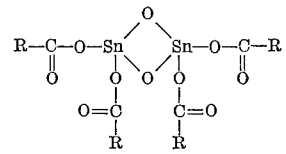

wherein R has the same value previously indicated.

The stannous acylates which are used in the preparation of the catalysts of the invention are the divalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, linoleic, ricinoleic, and the like.

Examples of specific stannous acylates which can be oxidized to the catalysts of this invention include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred compounds are stannous acetate, stannous octoate and stannous oleate.

In carrying out the invention, the oxidized stannous acylate catalysts are mixed with epoxides to obtain a homogeneous curable composition. With epoxides that are liquid and viscous, the catalyst can be simply admixed with the epoxide by conventional means as, for example, by stirrers and impellers, etc. When the catalyst and epoxide are immiscible at room temperatures; or if the epoxide is normally solid, the epoxide can be melted or mixed with a liquid organic solvent. Typical solvents include organic ethers such as diethyl ether, methyl propyl ether, etc.; organic esters such as methyl acetate, ethyl propionate, etc.; and organic ketones such as acetone and cyclohexanone, etc.

The amount of catalyst employed will vary with the cure rate desired and the curing temperature employed. As a general guide, good results are obtained by utilizing the stannic catalyst in amounts ranging between 0.001 and 20 percent, preferably 0.1 to 10 percent by weight based on the total weight of the curable epoxide composition.

The mixture of epoxide composition and catalyst can be cured over a wide temperature range. For example, the catalyst can be added to the epoxide composition at room temperatures, i.e., about 15° C. to 25° C., and the cure effected, or if a rapid cure is desired the mixture can be heated to temperatures as high as 250° C. or more. Higher temperatures above 250° C. are generally undesirable due to the discoloration which may be induced. Other single curing temperatures and combinations of curing temperatures can be employed as desired.

The catalysts described above are used to promote the cure of a wide variety of known monoepoxide and polyepoxide compositions, the cured composition produced being in the form of a homopolymer, or copolymer with an active organic hardener. The curable epoxide compositions can be monomeric or polymeric, saturated or unsaturated, aliphatic, aromatic or heterocyclic, and can be substituted, if desired, with substituents such as hydroxy, halide, alkyl, aryl, carboxyl, and the like. Thus, for example, the instant invention contemplates the preparation of homopolymers and copolymers of monoepoxides and polyepoxides containing cyclohexene oxide, cyclopentene oxide, bicycloheptene oxide, and cyclooctene oxide groups. Also included are the epoxidized alkenes, the glycidyl ethers of polyhydric phenols and alcohols, epoxidized polybutadiene, epoxidized copolymers of butadiene, epoxidized natural oils, and the like.

In one embodiment of the instant invention the monomeric polyepoxides which can be cured with the catalysts contain at least two oxirane oxygen atoms, at least one of which is bonded to two vicinal cycloaliphatic carbon atoms. The other oxygen atom is also bonded to two vicinal carbon atoms, but the carbon atoms need not necessarily form part of a cycloaliphatic ring. Thus, the polyepoxide component contains at least two vicinal epoxy groups, i.e.,

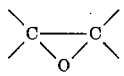

the epoxy carbon atoms of at least one of the groups forming a portion of a cycloaliphatic hydrocarbon nucleus. The cycloaliphatic nucleus preferably contains from 4 to 8 carbon atoms including the epoxy carbon atoms, and preferably from 5 to 7 carbon atoms.

Diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides include, for example, the alkanediol bis(3,4-epoxycyclohexanecarboxylates),
the alkenediol bis(3,4-epoxycyclohexanecarboxylates),
the alkanediol bis(lower alkyl substituted-3,4-
  epoxycyclohexanecarboxylates),
the oxaalkanediol bis(lower alkyl substituted-3,4-
  epoxycyclohexanecarboxylates),
the alkanetriol tris(3,4-epoxycyclohexanecarboxylate),
the alkenetriol tris(3,4-epoxycyclohexanecarboxylates),
the alkanetriol tris(lower alkyl substituted-3,4-
  epoxycyclohexanecarboxylates),
the oxaalkanetriol tris(3,4-epoxycyclohexane-
  carboxylates),
the oxaalkanetriol tris(lower alkyl substituted-3,4-
  epoxycyclohexanecarboxylates), and the like. The above-illustrated polyol poly(3,4-epoxycyclohexanecarboxylates) can be prepared by epoxidizing the corresponding polyol poly(cyclohexenecarboxylate) with at least a stoichiometric quantity of peracetic acid (preferably contained as solution in ethyl acetate) per carbon to carbon double bond of said polyol poly(cyclohexenecarboxylate), at a temperature in the range of from about 25° to 90° C., for a period of time sufficient to introduce oxirane oxygen at the sites of all the carbon to carbon double bonds contained in the polyol poly(cyclohexenecarboxylate) reagent. The polyol poly(cyclohexenecarboxylates), in turn, can be prepared in accordance with well known condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, 1,2,3-propanetriol, trimethylolmethane, 1,1,1-trimethylolethane, 1,1,1-trimethylolpropane, 1,2,6-hexanetriol, cycloaliphatic triols, aromatic triols, and the like; with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other polyepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate,
bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) glutaconate,
bis(3,4-epoxycyclohexylmethyl) hydromuconate,
and the like.

Other desirable polyepoxides include the monoesters of 3,4-epoxycyclohexylmethanols and 3,4-epoxycyclohexanecarboxylic acids such as, for example, 3,4-epoxycyclohexylmethyl 3,4-epoxycyclohexane-
  carboxylate,
1-methyl-3,4-epoxycyclohexylmethyl 1-methyl-3,4-
  epoxycyclohexanecarboxylate,
6-methyl-3,4-epoxycyclohexylmethyl 6-methyl-3,4-
  epoxycyclohexanecarboxylate,
2-ethyl-3,4-epoxycyclohexylmethyl 2-ethyl-3,4-
  epoxycyclohexanecarboxylate,
4-n-propyl-3,4-epoxycyclohexylmethyl 4-n-propyl-3,4-
  epoxycyclohexanecarboxylate,
5-isobutyl-3,4-epoxycyclohexylmethyl 5-isobutyl-3,4-
  epoxycyclohexanecarboxylate,
lower alkyl substituted 3,4-epoxycyclohexylmethyl lower
  alkyl substituted-3,4-epoxycyclohexanecarboxylate,
halo substituted-3,4-epoxycyclohexylmethyl halo
  substituted-3,4-epoxycyclohexanecarboxylate,
1-chloro-3,4-epoxycyclohexylmethyl 1-chloro-3,4-
  epoxycyclohexanecarboxylate,
2-bromo-3,4-epoxycyclohexylmethyl 2-bromo-3,4-
  epoxycyclohexanecarboxylate, and the like.

Still other desirable polyepoxides include, by way of illustration, the 3-oxatetracyclo[4.4.0.1$^{7,10}$.0$^{2,4}$]undec-8-yl vicinal-
  epoxyalkyl ethers, the 3-oxatetracyclo[4.4.0.1⁷,¹⁰.0²,⁴]undec-8-yl vicinal-epoxycycloalkyl ethers,
the 3-oxatetracyclo[4.4.0.1⁷,¹⁰.0²,⁴]undec-8-yl vicinal-epoxycycloalkylalkyl ethers,
the 3-oxatetracyclo[4.4.0.1⁷,¹⁰.0²,⁴]undec-8-yl 3-oxatricyclo[3.2.1.0²,⁴]oct-6-yl ethers,
the 3-oxatetracyclo[4.4.0.1⁷,¹⁰.0²,⁴]undec-8-yl 3-oxatricyclo[3.2.1.0²,⁴]oct-6-ylalkyl ethers, and the like.

Specific examples include 3-oxatetracyclo[4.4.0.1⁷,¹⁰.0²,⁴]undec-8-yl 2,3-epoxypropyl ether,
3-oxatetracyclo[4.4.0.1⁷,¹⁰.0²,⁴]undec-8-yl 3,4-epoxybutyl ether,
3-oxatetracyclo[4.4.0.1⁷,¹⁰.0²,⁴]undec-8-yl 2,3-epoxybutyl ether,
3-oxatetracyclo[4.4.0.1⁷,¹⁰.0²,⁴]undec-8-yl 3,4-epoxyhexyl ether,
3-oxatetracyclo[4.4.0.1⁷,¹⁰.0²,⁴]undec-8-yl 5,6-epoxy hexyl ether,
3-oxatetracyclo[4.4.0.1⁷,¹⁰.0²,⁴]undec-8-yl 7,8-epoxyoctyl ether,
3-oxatetracyclo[4.4.0.1⁷,¹⁰.0²,⁴]undec-8-yl 2-methyl-2,3-epoxypropyl ether,
3-oxatetracyclo[4.4.0.1⁷,¹⁰.0²,⁴]undec-8-yl 2-ethyl-2,3-epoxyhexyl ether,
3-oxatetracyclo[4.4.0.1⁷,¹⁰.0²,⁴]undec-8-yl 9,10-epoxystearyl ether,
3-oxatetracyclo[4.4.0.1⁷,¹⁰.0²,⁴]undec-8-yl 9,10,12,13-diepoxystearyl ether,
3-oxatetracyclo[4.4.0.1⁷,¹⁰.0²,⁴]undec-8-yl 2,3-epoxycyclopentyl ether,
3-oxatetracyclo[4.4.0.1⁷,¹⁰.0²,⁴]undec-8-yl 2,3-epoxycyclopentylmethyl ether,
3-oxatetracyclo[4.4.0.1⁷,¹⁰.0²,⁴]undec-8-yl alkyl substituted 3,4-epoxycyclohexyl ether,
3-oxatetracyclo[4.4.0.1⁷,¹⁰.0²,⁴]undec-8-yl 3,4-epoxycyclohexyl ether,
3-oxatetracyclo[4.4.0.1⁷,¹⁰.0²,⁴]undec-8-yl 2,3-epoxycyclohexyl ether,
3-oxatetracyclo[4.4.0.1⁷,¹⁰.0²,⁴]undec-8-yl 3,4-epoxycyclohexylmethyl ether
3-oxatetracyclo[4.4.0.1⁷,¹⁰.0²,⁴]undec-8-yl 6-methyl-3,4-epoxycyclohexylmethyl ether,
3-oxatetracyclo[4.4.0.1⁷,¹⁰.0²,⁴]undec-8-yl 5-methyl-3,4-epoxycyclohexylmethyl ether,
3-oxatetracyclo[4.4.0.1⁷,¹⁰.0²,⁴]undec-8-yl alkyl substituted 3-oxatricyclo[3.2.1.0²,⁴]oct-6-yl ether,
3-oxatetracyclo[4.4.0.1⁷,¹⁰.0²,⁴]undec-8-yl 3-oxatricyclo-[3.2.1.0²,⁴]oct-6-yl ether, and the like.

Examples of other monomeric polyepoxides, include 1,4-bis(2,3-epoxypropoxy)benzene,
1,3-bis(2,3-epoxypropoxy)benzene,
4,4'-bis(2,3-epoxypropoxy) diphenyl ether,
1,8-bis(2,3-epoxypropoxy) octane,
1,4-bis(2,3-epoxypropoxy)cyclohexane,
4,4'-bis(2-hydroxy-3-4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene, Examples of vic-epoxyhydrocarbyl substituted aromatic hydrocarbons and halo-substituted aromatic hydrocarbons include, among others, 1,4-bis(2,3-epoxypropyl)benzene,
1,4-bis(2,3-epoxycyclohexyl)benzene,
1,4-bis(2,3-epoxybutyl)benzene,
1,3-bis(2,3-epoxypropyl)benzene,
1,4-bis(2,3-epoxyhexyl)benzene,
1-(3,4-epoxypentyl)-4-(2,3-epoxypropyl)benzene,
1,2-di(2,3-epoxypropyl)benzene,
4,4'-bis(2,3-epoxypropyl)diphenyl,
1,5-bis(2,3-epoxypropyl)naphthalene,
2,6-bis(2,3-epoxypropyl)naphthalene,
1,4-bis(2,3-epoxypropyl)-2,3,5,6-tetramethyl benzene, and the like.

The epoxidized polymers which can be cured with the oxidized stannous acylate catalysts of this invention are polymeric molecules which contain, on the average, at least one vicinal epoxy group, i.e.,

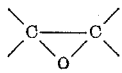

and preferably, a plurality of vicinal epoxy groups. These epoxidized polymers can be prepared by the epoxidation of the corresponding olefinically unsaturated polymer precursor which has an average molecular weight in the range of from about 250 to about 250,000, and higher, preferably from about 250 to about 25,000, and preferably still, from about 500 to about 10,000. The term "average" is to be noted since the individual molecules of a given sample of olefinically unsaturated polymeric product which result from the polymerization reaction of the appropriate monomeric reagent(s), in general, vary in molecular weight (or degree of polymerization). Consequently, the overall molecular weight of the sample is the average of the molecular weight of the individual polymeric molecules which comprise said sample.

In a broad aspect, the epoxidized polymers which are contemplated include, among others, the partially to essentially completely epoxidized polymers of conjugated dienes; the partially to essentially completely epoxidized copolymers of conjugated dienes with olefinic monomers; and the like. The term "polymer," as employed herein including the appended claims, is used in its generic sense to encompass homopolymers and copolymers. It is pointed out, also, that the term "partially to essentially completely epoxidized" (polymers or copolymers) means that the epoxidized polymers which are useful in the invention can range from those which contain, on the average, at least one single vicinal epoxy group and, on the average, a plurality of ethylenic groups to those which contain, on the average, a plurality of vicinal epoxy groups and relatively few, or none, ethylenic groups. As a practical matter, especially from a commercial standpoint, it is somewhat difficult and expensive to fully and completely epoxidize the olefinically unsaturated polymer precursor.

In one aspect, the epoxidized polymers which are contemplated as a component(s) in the novel curable compositions contain at least one percent oxirane oxygen to below about 23 percent oxirane oxygen, and preferably, from about 3 to about 12 percent oxirane oxygen. The term "percent oxirane oxygen" designates the number of grams of oxirane oxygen per 100 grams of a sample of epoxidized polymer. The upper limit regarding the percent oxirane oxygen is a variable which will depend upon the average molecular weight of the olefinically unsaturated polymer precursor, the degree of epoxidation of the olefinically unsaturated polymer precursor, the monomers employed to prepare said precursor, the degree and number of side reactions which can occur during the epoxidation reaction other than that of introducing oxirane oxygen at the site of the ethylenic carbon to carbon double bond of said precursor, and the like. Nevertheless, the invention contemplates the use of essentially completely epoxidized polymers, and consequently, the determination of the upper limit of percent oxirane oxygen is readily determined via ordinary experimentation by a chemist. However, it must be borne in mind that with regard to the upper limit of percent oxirane oxygen, this limit is a variable governed by practical and readily determined factors such as those illustrated above.

The conjugated dienic monomers which are useful in preparing the non-epoxidized polymers, i.e., the olefinically unsaturated polymer precursors, are characterized by the unit,

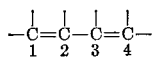

whereas the olefinic monomers are characterized by at least one

unit. It is apparent, therefore, that the olefinic monomer can contain more than one

unit; however, said olefinic monomer is non-conjugated. It is desirable to exclude conjugated dienic monomers which contain so-called negative substituents, e.g., chloro, bromo, and cyano, monovalently bonded to the carbon atoms designated by the numerals 2 and 3—of the unit

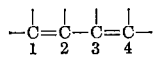

Such conjugated dienic monomers can undergo what is known as 1,4-addition polymerization, e.g., in the homopolymerization of 1,3-butadiene, to yield a polymer containing the unit

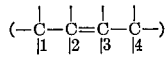

However, the presence of negative groups on the ethylenic carbon atoms of polymers which result from the 1,4-addition route tends to inactivate the ethylenic group toward epoxidation, i.e., the introduction of oxirane oxygen at the site of the resulting carbon to carbon double bond is difficult when negative groups are attached to the ethylenic carbon atoms of the polymer.

Specific illustrative conjugated dienic monomers which are useful in the preparation of the non-epoxidized polymers include, for example, 1,3-butadiene, 1-methyl-1,3-butadiene, 2-methyl-1,3-butadiene, 2-ethyl-1,3-butadiene, 1, 1-dimethyl-1,3-butadiene, 1,4-dimethyl-1,3-butadiene, 2,3-dimethyl-1,3-butadiene, 2-isopropyl-1,3-butadiene, 1,3-n-propyl-1,3-butadiene, 1-phenyl-1,3-butadiene, 1-ethoxy-1, 3-butadiene, 1-acetoxy-1,3-butadiene, 1-allyl-1,3-butadiene, 2-methyl-6-methylene-2,7-octadiene, and the like. Conjugated dienic hydrocarbon monomers which contain from 4 to 8 carbon atoms are preferred in the preparation of the non-epoxidized homopolymers and copolymers. Conjugated butadine is most preferred.

Exemplary olefinic monomers which are useful in the preparation of the non-epoxidized copolymers include, for instance, ethylene, propylene, isobutylene, butene-1, styrene, vinyltoluene, isopropenylbenzene, 4-vinylcyclohexene, divinylbenzene, vinyl chloride, allyl chloride, alpha-methylstyrene, alpha-chlorostyrene, 2,5-dichlorostyrene, 4-cyanostyrene, 2-hydroxystyrene, 2-acetoxystyrene, chlorotrifluoroethylene, vinylidene chloride, vinyl fluoride, vinylidene fluoride, vinyl bromide, methyl acrylate, methyl methacrylate, ethyl methacrylate, octyl methacrylate, methyl crotonate, butyl crotonate, ethyl crotonate, dimethyl maleate, dibutyl maleate, dioctyl maleate, diethyl chloromaleate, diethyl fumarate, vinyl acetate, vinyl butyrate, vinyl 2-ethyl-hexanoate, vinyl stearate, vinyl oleate, vinyl linoleate, vinyl benzoate, vinyl crotonate, allyl acetate, acrylonitrile, methylacrylonitrile, acrylamide, methacrylamide, crotonamide, N-vinylbenzamide, N-vinylbutyramide, methyl vinyl ketone, methyl isopropenyl ketone, acrolein, vinyl ethyl ether, vinyl butyl ether, 2-vinylpyridine, N-vinylcarbazole, and the like. Preferred olefinic monomers include the alkenes, the phenyl substituted-alkenes, the olefinically unsaturated organic esters, the olefinically unsaturated amides, the olefinically unsaturated nitriles, and the like. Styrene, the lower alkyl acrylates, and the alkenes which contain up to 5 carbon atoms are most preferred.

The preparation of the non-epoxidized homopolymers and copolymers is well documented in the literature. For examples U.S. Patents 2,500,933, 2,586,594, and 2,631,175 are illustrative of the reagents and modes for preparing various non-epoxidized polymers. Liquid polybutadiene which has an average molecular weight of at least 250 is highly preferred.

The preparation of the epoxidized polymers which are employed as a component(s) in the novel curable, polymerizable compositions can be accomplished by epoxidizing the corresponding olefinically unsaturated homopolymer or copolymer precursors such as those exemplified previously with well known epoxidizing agents, and preferably with organic peracids. Since the epoxidation reaction is carried out in a liquid phase, practical considerations are readily suggested to the chemist skilled in the epoxy art. Thus, if the olefinically unsaturated homopolymer or copolymer precursor is a liquid, then an inert normally liquid organic solvent is not essential, though one can be employed if desired. However, if the unsaturated homopolymer or copolymer precursor is a solid, then said solid precursor should be soluble in an inert normally liquid organic vehicle in order for it to undergo effective epoxidation. Inert organic vehicles such as chloroform, toluene, benzene, ethylbenzene, xylene, acetone, methyl ethyl ketone, butyl acetone, ethyl acetate, and the like, are illustrative of the common solvents which may be employed. The particular homopolymer or copolymer precursor, its degree of polymerization, i.e., its average molecular weight, its preparation, and other factors, will influence, to a large extent, the solubility of said precursor in any given inert normally liquid organic vehicle. It is readily recognized by polymer chemists that many highly polymerized compounds are solids of extremely limited solubility in otherwise useful inert organic media, and in this respect, a practical upper limit is imposed on the degree of polymerization of the olefinically unsaturated homopolymer or copolymer precursor. Thus, the solid non-epoxidized olefinically unsaturated polymers which are contemplated are soluble in an inert normally liquid vehicle, the choice of said inert normally liquid vehicle being readily determined by the merest of routine experimentation by the artisan in the epoxy art.

Other useful polyepoxides include epoxides derived from natural oils, such as linseed oil epoxide, soybean oil epoxide, safflower oil epoxide, tung oil epoxide, castor oil epoxide, lard oil epoxide, and the like, which are glycerides containing 45 to 80 carbon atoms.

The catalysts of the instant invention can also be employed to cure monoepoxides, i.e., compounds containing only one vicinal epoxy group, which may be present as part of a cycloaliphatic nucleus or part of an aliphatic chain. Typical monoepoxide compounds include ethylene oxide, propylene oxide, 1,2-epoxyoctane, cyclohexene oxide, 1,2-epoxypropyl benzene, and the like.

It should be noted that the aforementioned epoxides are given only for purposes of illustrating the wide variety of monoepoxides and polyepoxides which can be cured by the catalysts of the instant invention and no unnecessary limitations are to be inferred therefrom.

The epoxides with the oxidized stannous acylate catalyst of the type illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, amino groups, thiol groups, and the like; and isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyols, i.e., polyhydric phenols and polyhydric alcohols, polythiols, polyisocyanates, polythioisocyanates, polyacyl halides and others. By the term "polyfunctional amine," as used herein, is meant an amine having at least two active amino hydrogen atoms which can be on the same nitrogen atom or different nitrogen atoms.

Resins having particularly valuable properties can be formed from mixtures containing the epoxide compositions and polyfunctional amines in such relative proportions as provide from 0.2 to 5.0 amino hydrogens of the amine for each epoxy group contained by said epoxide composition. It is preferred to form resins from curable mixtures containing the epoxide compositions and polyfunctional amines which provide from 0.3 to 3.0 amino hydrogens for each epoxy group.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Tyical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho- and paraphenylenediamines, 1,4 - naphthalenediamine, 3,4 - toluenediamine and the like.

Illustrative cycloaliphatic amines include cyclopentylamine, cyclohexylamine, p - menthane - 1,8 - diamine and others.

Among the polyamides, i.e., those having an average molecular weight range from about 300 to about 10,000, include condensation products of polycarboxylic acids, in particular, hydrocarbon dicarboxylic acids such as malonic acid, succinic acid, glutaric acid, adipic acid, dilinolenic acid, and the like, with polyamines, particularly diamines such as ethylenediamine, propylenediamine, and the like.

Aliphatic polyamines include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylpentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenyl, 4-aminophenyl, 2,3-diaminoxylenol, and the like.

Other illustrations of polyfunctional amines are the addition products of polyamines, in particular, diamines and triamines and epoxides containing oxirane oxygen linked to vicinal carbon atoms such as ethylene oxide, propylene oxide, butadiene dioxide, diglycidyl ether, epoxidized soybean oil, epoxidized safflower oil, and polyglycidyl polyethers such as those prepared from polyhydric phenols and epichlorohydrin. Particularly useful polyfunctional amines are the mono- and polyhydroxyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p' - sulfonyldianiline, 3,9 - bis(aminoethyl) spirobimetadioxane, hexahydrobenzamide, and others.

Other polyfunctional amines having a total of at least two active amino hydrogen atoms to the molecule can be employed in the epoxide compositions of this invention. For example, such polyfunctional amines as mixtures of p,p' - methylenedianiline and m - phenylenediamine, or other mixtures of two or more polyfunctional amines can be used.

Another class of active organic hardeners which can be reacted with the epoxide compositions above, are the polycarboxylic acids. By the term "polycarboxylic acid," as used herein, is meant a compound or polymer having two or more carboxyl groups to the molecule. Curable mixtures can be formed from the epoxide compositions and polycarboxylic acids, which mixtures can be cured to produce a wide variety of useful products. Valuable resins can be made from mixtures containing such amounts of an epoxide composition and polycarboxylic acid as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl group of the acid for each epoxy group from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alphahydromuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8 - naphthalenedicarboxylic acid, 3 - carboxycinnamic acid, 1,2 - naphthalenedicarboxylic acid, 1,1,5-pentanetricarboxylic acid, 1,2,4-hexanetricarboxylic acid, 2-propyl-1,2,4-pentanetricarboxylic acid, 5 - octene - 3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4 - benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like, such as the dimer and trimer acids of commerce.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein is meant polyesters containing two or more carboxy groups per molecule. These polycarboxy polyesters can be prepared by known condensation procedures, empolying mol ratios favoring greater than equivalent amounts of polycarboxlic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols such as ethylene glycol,
diethylene glycol,
triethylene glycol,
tetraethylene glycol,
1,2-propylene glycol,
1,3-propylene glycol,
dipropylene glycols,
tripropylene glycols,
polyoxyethylene glycols,
polyoxypropylene glycols,
1,2-butylene glycol,
1,4-butylene glycol,
pentane-1,5-diol,
pentane-2,4-diol,
2,2-dimethyltrimethylene glycol,
hexane-1,4-diol,
hexane-1,5-diol,
hexane-1,6-diol,
hexane-2,5-diol,
3-methylpentane-1,5-diol,
2-methylpentane-2,5-diol,
3-methylpentane-2,5-diol,
2,2-diethylpropane-1,3-diol,
2,2-diethylhexane-1,3-diol,
2,5-dimethylhexane-2,5-diol,
octadecane-1,12-diol,
1-butene-3,4-diol,
2-butene-1,4-diol,
2-butyne-1,4-diol,
2,5-dimethyl-3-hexyne-2,5-diol and the like; trihydric alcohols such as glycerol, trimethylolethane, hexane-1,2,6-triol, 1,1,1-trimethylolpropane, and the ethylene oxide and propylene oxide adducts thereof; tetrahydric compounds such as pentaerythritol, diglycerol and the like; and high polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters, it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxylic polyesters useful in the compositions are those which provide polyesters having more than one carboxy group per molecule.

Curable mixtures containing the epoxide compositions and polycarboxylic acid anhydrides can also be employed to produce resins having diversified and valuable properties. Particularly valuable resins can be made from mixture containing such amounts of polycarboxylic acid anhydride and epoxide compositions as to provide 0.2 to 3.0 carboxy equivalent of the anhydride for each epoxy group of the epoxide composition. It is prefered, however, to make resins from curable mixtures which contain such amounts of polycarboxylic acid anhydride and epoxide composition as to provide 0.4 to 2.0 carboxy equivalent of anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorophthalic anhydride, tetrahydrophthalic chlorophthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid and the like. Also, other dicarboxylic acid anhydrides, useful in our polymerizable compositions include the Diels-Alder adducts of maleic acid and alicyclic compounds having conjugated double bonds, e.g., methylbicyclo[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture, it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

Representative polyols include ethylene glycol, diethylene glycol, polyethylene glycols, propylene glycol, dipropylene glycol, polypropylene glycols, trimethylene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)methane, and the ethylene and propylene oxide adducts thereof, etc.

*Examples 1–12*

In the following examples, various proportions of 3,4-epoxy-6-methylcyclohexylmethyl 3,4-epoxy-6-methylcyclohexanecarboxylate were mixed with oxidized stannous octoate catalyst and various active organic hardeners.

The procedure for testing the catalyst with the epoxide and various hardeners, as summarized in Table I, was as follows: In general, the epoxide and hardener were mixed at room temperature, warmed to the minimum temperature necessary for solution to occur and catalyst added. After bringing the contents of the tubes to 150° C., the tubes were closed and placed in the oven at this temperature. In every case, the catalysts caused the liquid mixtures to gel much more rapidly and produce harder resins than the controls. Even in those cases where gels at 150° C. were not observed, use of catalysts gave much thicker liquids at room temperature. In all experiments the total resin charge was 23 grams and 0.23 gram (1.0 percent) of catalyst was used. Unless otherwise indicated all resins were cured for 22 hours at 150° C.

Found: Sn, 28.2; C, 45.03; H, 7.16; refraction index, $N_D^{30} = 1.4835$; molecular weight, calculated for $$C_{32}H_{60}O_{10}Sn_2$$

842. Found: 762 and 923 (ebullioscopic in benzene).

TABLE I

| Example No. | Epoxide,[c] Gms. | Hardener | | Oxidized Stannous Octoate, Gms. | Ratio [a] | Gel Time at 150° C. | Barcol [b] |
|---|---|---|---|---|---|---|---|
| | | Name | Gms. | | | | |
| 1 | 20.1 | 1,2,6-hexanetriol | 2.9 | 0.23 | 1:0.5 | 3–22 hrs | 0 |
| 2 | 20.1 | ----do---- | 2.9 | | 1:0.5 | None | Liq. |
| 3 | 16.7 | Bisphenol A | 6.3 | 0.23 | 1:0.5 | 0–5 mins | 30 |
| 4 | 16.7 | ----do---- | 6.3 | | 1:0.5 | 6–22 hrs | 0 |
| 5 | 14.5 | Methyl Nadic Anhydride [d] | 8.5 | 0.23 | 1:1 | 33–38 mins | |
| 6 | 14.5 | Methyl Nadic Anhydride | 8.5 | | 1:1 | 6–22 hrs | |
| 7 | 14.7 | Toluenediisocyanate [e] | 8.3 | 0.23 | 1:1 | 24–29 mins | 25 |
| 8 | 14.7 | Toluenediisocyanate [f] | 8.3 | | 1:1 | 6–22 hrs | Soft |
| 9 | 17.3 | Sebacic Acid | 5.7 | 0.23 | 1:0.5 | 0–3 mins | 22 |
| 10 | 17.3 | ----do---- | 5.7 | | 1:0.5 | 1.5–1.75 hrs | 0 |
| 11 | 11.5 | Dimer Acid [b] | 11.5 | 0.23 | 1:0.5 | 0–7 mins | |
| 12 | 11.5 | Dimer Acid | 11.5 | | 1:0.5 | 6–22 hrs | |

[a] Ratio of Epoxide to reactive or functional group.
[b] Barcol Impressor GYZJ934-1 was used to determine Barcol No.
[c] 3,4-epoxy-6-methylcyclohexylmethyl 3,4-epoxy-6-methylcyclohexanecarboxylate.
[d] Methylbicyclo-[2.2.1]heptane-2,3-dicarboxylic acid anhydride.
[e] 20 percent 2,6- and 80 percent 2,4-isomer.
[f] Emery Empol 1022 Dimer acid; 578 mol. wt., neutralization equivalent=300.

*Examples 13–22*

The following examples demonstrate the effectiveness of the oxidized stannous octoate catalyst with various types of polyepoxides and an anhydride hardener. The catalyst was added to a homogeneous solution as before and the curing was performed at the temperature and for the periods indicated. The results obtained are given in Table II below.

Infrared spectrum indicated absorption maxima at $3.6\mu$–$3.9\mu$ (broad acid —OH); $5.89\mu$ (free acid C=0); $6.45\mu$ and $6.85\mu$

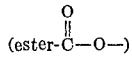

(ester-C—O—)

In a similar manner other catalysts can be prepared by the oxidation of, for example, stannous acetate, stan-

TABLE II

| Example No. | Epoxide [a] | Gms. | Methyl Nadic Anhydride, Gms. | Ratio [b] | Catalyst, Gms. | Gel Time at 150° C. | Cure at 150° C., Hrs. |
|---|---|---|---|---|---|---|---|
| 13 | A | 10.1 | 12.9 | 1/1 | 0.23 | 0–1 min./30–110° C | 6 |
| 14 | A | 10.1 | 12.9 | 1/1 | None | No Gel | 6 |
| 15 | B | 16.7 | 6.3 | 1/1 | 0.23 | 54–64 mins | 6 |
| 16 | B | 16.7 | 6.3 | 1/1 | None | No Gel | 6 |
| 17 | C | 17.7 | 5.3 | 1/1 | 0.23 | 6–22 hrs | 22 |
| 18 | C | 17.7 | 5.3 | 1/1 | None | No Gel | 22 |
| 19 | D | 16.8 | 6.2 | 1/1 | 0.23 | 84–99 mins | 6 |
| 20 | D | 16.8 | 6.2 | 1/1 | None | 2¾–3¾ hrs | 22 |
| 21 | E | 16.3 | 6.7 | 1/1 | 0.23 | 1.75–2 hrs | 6 |
| 22 | E | 16.3 | 6.7 | 1/1 | None | 4–4¼ hrs | 22 |

[a] Epoxide A=vinylcyclohexene dioxide.
Epoxide B=bis (3,4-epoxy-6-methylcyclohexylmethyl)adipate.
Epoxide C=soybean oil epoxide.
Epoxide D=1,2,3-propanetriol tris-(3,4-epoxycyclohexanecarboxylate).
Epoxide E=1,1,1-trimethylolpropane tris-(3,4-epoxycyclohexanecarboxylate).
[b] Ratio of epoxide to reactive or functional group.

*Example 23.—Preparation of oxidized stannous octoate*

To a two-liter four-neck flask equipped with thermometer, water cooled condenser, mechanical stirrer, drying tower, wet meter and flow meter, were added 500 grams of stannous octoate. The contents of the flask was stirred vigorously while dry oxygen was passed over the liquid at an average rate of 0.389 liter per minute for a total period of three hours and forty five minutes. The oxygen was measured entering the flask with a calibrated flow meter and leaving the flask with a wet meter. At the beginning of the reaction the flask was at room temperature, i.e., approximately 26° C. thereafter it was heated gradually to about 120°–125° C. over a two hour period. At the completion of the reaction the flask was cooled, the oxygen flow stopped. 12.96 liters of oxygen had been consumed during the reaction as evidenced by the difference in flow meter and wet meter readings. Analysis of the oxidized stannous octoate indicated the following: Calculated for $C_{16}H_{30}O_5Sn$: Sn, 28.2; C, 45.7, H, 7.2.

nous propionate, stannous oxalate, stannous tartrate, stannous butyrate, and the like.

Although the invention had been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A curable composition comprising an epoxide compound containing at least one vicinal epoxy group and a catalytic amount of a catalyst prepared by reacting a liquid stannous acylate of the formula:

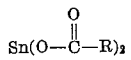

$$Sn(O-\overset{O}{\underset{\|}{C}}-R)_2$$

wherein each R is a monovalent hydrocarbon radical containing from 1 to 54 carbon atoms, with an anhydrous oxidizing agent selected from the group consisting of oxygen, benzoyl peroxide, diacetyl peroxide, and potassium permanganate at a temperature of from 25° C. to 125° C.

2. A composition as claimed in claim 1 wherein the epoxide compound contains a cyclohexane structure.

3. A composition as claimed in claim 1 wherein the epoxide is an epoxycyclohexylalkyl epoxycyclohexanecarboxylate.

4. A composition comprising an epoxide compound containing at least one vicinal epoxy group; an active organic hardener selected from the group consisting of polyfunctional amines, polycarboxylic acids, polycarboxylic acid anhydrides, polyols, polythiols, polyisocyanates, polyisothiocyanates and polyacyl halides; and a catalytic amount of a catalyst prepared by reacting a liquid stannous acylate of the formula:

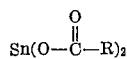

wherein each R is a monovalent hydrocarbon radical containing from 1 to 54 carbon atoms, with an anhydrous oxidizing agent selected from the group consisting of oxygen, benzoyl peroxide, diacetyl peroxide, and potassium permanganate at a temperature of from 25° C. to 125° C.

5. A composition as claimed in claim 4 wherein the active organic hardener is a polycarboxylic acid.

6. A composition as claimed in claim 4 wherein the stannous acylate is of the formula:

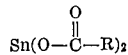

wherein each R is a monovalent hydrocarbon radical containing from 1 to 24 carbon atoms.

7. A composition as claimed in claim 4 wherein the stannous acylate is stannous octoate.

References Cited by the Examiner

UNITED STATES PATENTS

| | | | |
|---|---|---|---|
| 2,054,099 | 9/1936 | Rothrock | 260—2 |
| 2,912,448 | 11/1959 | Ramsden | 260—429.7 |
| 2,917,491 | 12/1959 | Phillips et al. | 260—78.4 |
| 2,933,459 | 4/1960 | Gurgiolo | 260—2 |
| 2,934,505 | 4/1960 | Gurgiolo | 260—2 |
| 2,934,548 | 4/1960 | Fath | 260—429.7 |
| 2,977,379 | 3/1961 | Dorfelt et al. | 260—429.7 |
| 3,117,099 | 1/1964 | Proops et al. | 260—2 |
| 3,208,955 | 9/1965 | Proops | 260—830 |

FOREIGN PATENTS 806,188   12/1958   Great Britain.

OTHER REFERENCES

Chem. Eng. News, 38 (No. 43), 58–59 (Oct. 24, 1960).

WILLIAM H. SHORT, *Primary Examiner.*

HAROLD N. BURSTEIN, *Examiner.*

A. L. LIBERMAN, T. D. KERWIN,
*Assistant Examiners.*